(12) United States Patent
Toyozawa et al.

(10) Patent No.: US 6,859,007 B2
(45) Date of Patent: Feb. 22, 2005

(54) SERVO MOTOR DRIVE CONTROL DEVICE

(75) Inventors: Yukio Toyozawa, Kumamoto (JP);
Naoto Sonoda, Kumamoto (JP)

(73) Assignee: Fanuc Ltd, Yamanashi (JP)

(*) Notice: Subject to any disclaimer, the term of this patent is extended or adjusted under 35 U.S.C. 154(b) by 0 days.

(21) Appl. No.: 10/758,037

(22) Filed: Jan. 16, 2004

(65) Prior Publication Data

US 2004/0145333 A1 Jul. 29, 2004

(30) Foreign Application Priority Data

| Jan. 20, 2003 | (JP) | .......... | 2003-011359 |
| May 14, 2003 | (JP) | .......... | 2003-135709 |

(51) Int. Cl.$^7$ .......... G05D 23/275
(52) U.S. Cl. .......... 318/632; 318/609; 318/610; 318/625; 700/29; 700/69
(58) Field of Search .......... 318/560, 561, 318/603–636, 591, 568.2; 700/29, 69, 13

(56) References Cited

U.S. PATENT DOCUMENTS

| 4,379,987 A | * | 4/1983 | Kohzai et al. .......... 318/561 |
| 5,173,649 A | * | 12/1992 | Wise .......... 318/615 |
| 5,929,700 A | * | 7/1999 | Fuller et al. .......... 327/556 |
| 5,994,864 A | * | 11/1999 | Inoue et al. .......... 318/568.2 |
| 6,046,566 A | * | 4/2000 | Sonoda et al. .......... 318/625 |
| 6,611,823 B1 | * | 8/2003 | Selmic et al. .......... 706/14 |
| 2001/0040845 A1 | * | 11/2001 | Taniguchi et al. .......... 369/47.2 |
| 2002/0151988 A1 | * | 10/2002 | Shiba et al. .......... 700/13 |
| 2003/0139824 A1 | * | 7/2003 | Akamatsu et al. .......... 700/29 |
| 2004/0085035 A1 | * | 5/2004 | Tazawa et al. .......... 318/432 |

FOREIGN PATENT DOCUMENTS

| JP | 04-323705 | 11/1992 |
| JP | 04-362702 | 12/1992 |
| JP | 06-309021 | 11/1994 |

* cited by examiner

*Primary Examiner*—Paul Ip
(74) *Attorney, Agent, or Firm*—Staas & Halsey LLP

(57) ABSTRACT

Learning control is performed when carrying out processing by repeating instructions in a pattern cycle. Time/position converting means determines a positional deviation for a prescribed position with respect to a reference position, from the positional deviation determined by sampling, and the reference position output in synchronization with the drive of the servo motor. Corresponding correction data stored in the memory means is added to the positional deviation, and then the result is subjected to filtering processing to update the correction data corresponding to the position. Position/time converting means then determines correction data for the current sampling time, on the basis of the correction data corresponding to the position as stored in the memory means, and the detected reference position. This correction data is processed to compensate for dynamic properties, thereby deriving a correctional quantity, which is added to the positional deviation.

9 Claims, 10 Drawing Sheets

1% VELOCITY CHANGE

CANNOT RESPOND TO VELOCITY CHANGE

CAN FOLLOW VELOCITY CHANGE

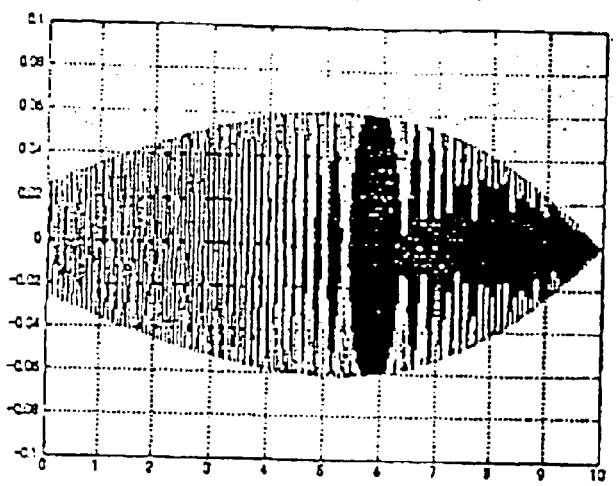
FIG. 11A POSITIONAL DEVIATION WHEN LEARNING NOT APPLIED (20 μm/div)
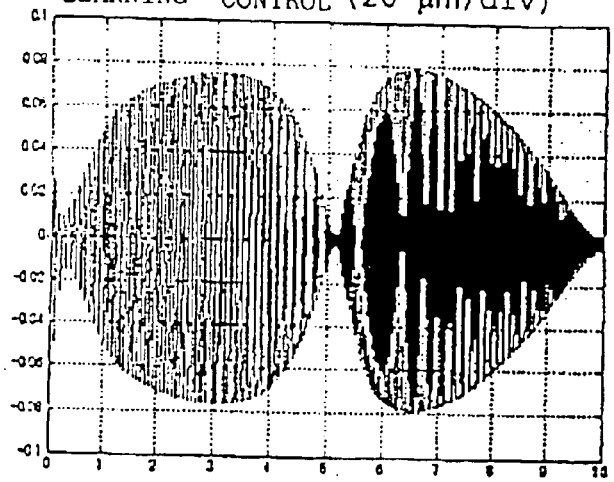
FIG. 11B CONVENTIONAL TIME-BASED LEARNING CONTROL (20 μm/div)
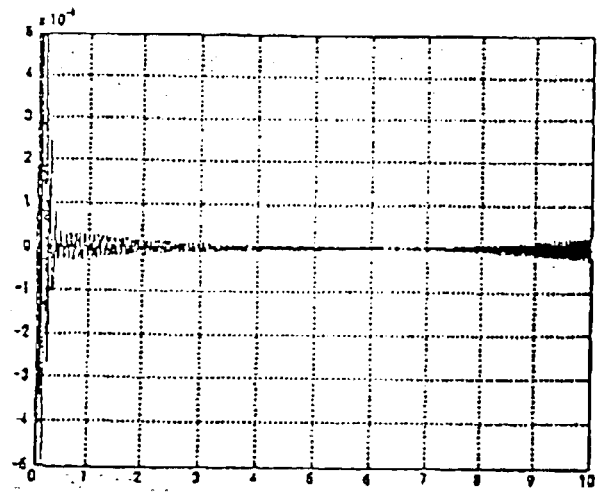
FIG. 11C ANGLE-BASED LEARNING CONTROL (1 μm/div)

SERVO MOTOR DRIVE CONTROL DEVICE

BACKGROUND OF THE INVENTION

1. Field of the Invention

The present invention relates to a drive control device for a servo motor, in a machine tool, industrial machine, or the like, which is driven and controlled by means of a control device, such as a numerical control device. In particular, it relates to learning control used when the same operating pattern is implemented repeatedly, in such a manner that the same pattern is processed repeatedly by means of positional commands of a prescribed uniform pattern.

2. Description of the Related Art

Learning control is already known as a method for increasing processing accuracy and making control deviation converge to zero, in cases where processing, or the like, is carried out by repeatedly instructing the same pattern of commands. This learning control involves setting the time period of a pattern operation, such as one rotation of a workpiece, or the like, as a learning cycle, rotating the workpiece for a plurality of times and determining the positional deviation at each prescribed control cycle, and storing correction data in a memory on the basis of this positional deviation, in such a manner that the positional deviation can then be made to converge to zero by adding, to the positional deviation at each control cycle of the current pattern cycle, the correction data at corresponding control cycle of the previous pattern cycle stored in the memory (see, for example, Japanese Patent Application Laid-open Nos. H4-362702 and H6-309021.

Moreover, a control method for linearly moving axes is also known which involves repeated control whereby, when processing a workpiece installed on a rotating axis by means of positional commands repeated at periodic intervals in synchronization with the rotating axis, using a tool installed in a linearly moving axis, the position of the linearly moving axis in correspondence with the position of the rotating axis at each prescribed sampling cycle is determined by means of a table and taken as a positional command for the linearly moving axis, in addition to which, correction data for one repetition cycle is determined and stored, on the basis of the positional deviation of the linearly moving axis, and, to the sampled positional deviation, the corresponding correction data for the previous repetition cycle is added to obtain a positional command (see Japanese Patent Application Laid-open No. H4-323705).

In the inventions disclosed in Japanese Patent Application Laid-open Nos. H4-362702 and H6-309021, mentioned above, correction data for one cycle of the learning control is stored in correspondence with the sampling time within each cycle, and therefore, if the command velocity changes, the learning cycle also changes, and hence the correction data obtained already by means of learning control will become unusable, and it will become necessary to create correction data again. Moreover, if the command velocity changes and there is no periodicity in that change, then the correction data obtained by learning control will be obtained in the form of a time function, and consequently the correction data obtained for a previous pattern cycle will not correspond to the correction data for each respective control cycle in the current pattern cycle, and will therefore be unusable.

The commands instructed in each cycle of the same pattern are positional commands, and these commands form a pattern corresponding to positions. However, in the memory storing correction data for one pattern cycle in learning control, the correction data for each prescribed control cycle, such as a position or velocity control cycle, is stored for one pattern cycle, and the oldest data of the correction data for each respective control cycle stored in the immediately previous pattern cycle, in other words, the correctional quantity based on the correction data of the previous pattern cycle, is added to the positional deviation, but since the speed of the motor varies, the correction data for the previous pattern cycle to be added to the current positional deviation does not correspond to the position of the drive object, such as the workpiece, or the like. As a result of this, the positional deviation does not converge to zero.

Moreover, as in the invention disclosed in Japanese Patent Application Laid-open No. H4-323705 mentioned above, in a method where, in the case of a rotating axis and a linearly moving axis driven in synchronization, correction data for the linearly moving axis is stored for one cycle of a repeated cycle, in correspondence with the position of a rotating axis, and the positional deviation of the linearly moving axis is reduced by correcting the sampled positional deviation by means of the correction data, then since the correction data is stored in accordance with a position of the rotating axis, it will still be possible to use the correction data effectively for repeated control and thereby to reduce the positional deviation, even if the velocity changes. However, in the invention disclosed in Japanese Patent Application Laid-open No. H4-323705, a conversion table is required for obtaining the position of the linearly moving axis from the feedback position of the rotating axis, and if the pattern for one pattern cycle has been changed, or the like, then a new conversion table of this kind must be created, which makes this method difficult to apply when processing various types of patterns, or the like.

SUMMARY OF THE INVENTION

The servo motor drive control device according to a first aspect of the present invention relates to a control device for driving and controlling a periodically operated drive object by means of a servo motor, comprising: a position detector for detecting the position of the drive object; means for obtaining the positional deviation between a positional command supplied to the servo motor and the position of the drive object as fed back by the position detector, for each sampling cycle; first converting means for converting the positional deviation into a positional deviation at a prescribed position with respect to a reference position output in synchronization with the drive of the drive object; correction data calculating means for determining, from the positional deviation at the prescribed position determined by the first converting means, correction data corresponding to the prescribed position; storing means for storing the correction data obtained by the correction data calculating means, for at least one cycle; and second converting means for converting the correction data for the prescribed position stored in the storing means, to correction data for each of the sampling cycles. The position of the drive object is controlled on the basis of the positional deviation and the correction data obtained by the second converting means.

The correction data calculating means may comprise: adding means for adding correction data for the prescribed position of the previous cycle as stored in the storing means, to the positional deviation at the prescribed position; and filtering means for filtering the positional deviation output by the adding means, determining new correction data, and outputting same to the storing means.

The servo motor drive control device according to a second aspect of the present invention relates to a control device for controlling and driving a periodically operated drive object by means a servo motor, by performing at least positional loop control, comprising: storing means for storing correction data for a prescribed position at a reference position output in synchronization with the drive of the drive object, for one cycle; second converting means for determining correction data for each sampling time period from the correction data corresponding to a prescribed position stored in the storing means; means for correcting the positional deviation by determining a correctional quantity from the correction data determined by the second converting means; adding means for adding the correction data determined by the second converting means to the positional deviation detected at each sampling period; filtering means for determining updated correction data for each sampling period by filtering the addition result from the adding means; and first converting means for determining correction data for each of the prescribed positions, from the correction data for each sampling period output by the filtering means, and outputting same to the storing means.

The servo motor drive control device according to the first or second aspect of the present invention may incorporate the following aspects.

The first converting means obtains a positional deviation at the prescribed position on the basis of the positional deviation detected at each sampling period, and the reference position.

The first converting means obtains correction data for the prescribed positions, respectively, from the correction data determined for each sampling period.

The reference position is either the command position supplied to the drive object or another drive object, or the detected position of the drive object or the other drive object.

The second converting means determines correction data for the sampling period on the basis of the reference position for the sampling period and the correction data corresponding to the prescribed position stored in the storing means.

A polarity judging section for judging the polarity of a velocity command or velocity feedback signal is also provided; and the storing means has two storing sections for respectively storing correction data according to the polarity of the velocity command or velocity feedback signal, so that the two storing sections are switched alternatively in accordance with the polarity of the velocity command or velocity feedback signal as judged by the polarity judging section.

The prescribed positions for the correction data stored in the storing means are determined respectively by taking the reference position when a reference signal is input from an external source, as a zero position.

According to the present invention, a servo motor drive control device is provided whereby learning control can still be applied effectively, even if there is a change in velocity, and furthermore, whereby learning control can be applied and positional deviation can be reduced, on the basis of a synchronizing positional signal.

BRIEF DESCRIPTION OF THE DRAWINGS

The aforementioned object and other objects and features of the present invention shall become apparent from the following description of the embodiments, with reference to the accompanying drawings, wherein:

FIG. 11A–FIG. 11C show experimental results for comparing positional deviation respectively in a case where no learning control is implemented (FIG. 11A), a case where conventional learning control is implemented (FIG. 11B), and a case where learning control according to the present invention (as in the mode in FIG. 6) is implemented (FIG. 11C).

DESCRIPTION OF THE PREFERRED EMBODIMENTS

Figure 1:
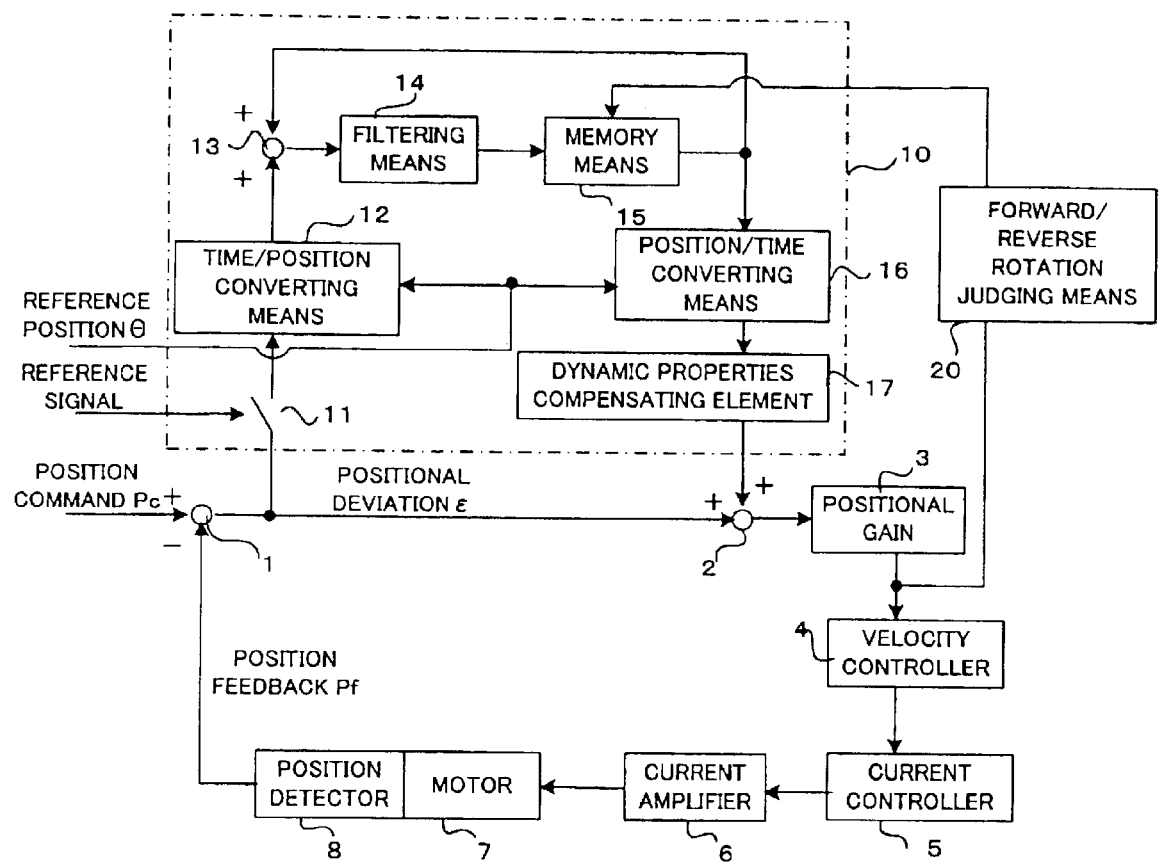
FIG. 1 is a principal block diagram of a first embodiment of the present invention.

FIG. 1 is a principal block diagram of one embodiment of the present invention. The positional deviation $\epsilon$ is determined by subtracting a feedback position Pf supplied by a positional detector 8 installed on a servo motor 7 for detecting the position of the servo motor (or detecting the position of a drive object driven by the servo motor), from a positional command Pc output by a master control unit, such as a numerical control device, or the like, in a computing device 1. A correctional quantity supplied by learning control means 10, described hereinafter, is then added to this positional deviation $\epsilon$ by means of a computing device 2, and the positional deviation thus corrected is then multiplied by a positional gain 3 to determine a velocity command. In other words, a velocity command is determined by performing positional loop control processing.

A current command is then determined by means of a velocity controller 4 performing velocity loop control processing with regard to this velocity command (or performing velocity loop control comprising proportional-plus-integral control, or the like, whereby a velocity deviation is determined from the difference between the velocity command and the velocity fed back from a velocity detector (not illustrated) which detects the velocity of the servo motor of the drive object). A current controller 5 then performs current loop control processing on the basis of this current command and a current value fed back from a current detector (not illustrated), and the servo motor 7 is driven and controlled by means of a current amplifier 6.

The composition and action described above are the same as those of a conventional servo controller, except for the fact that a correctional quantity from the learning control means 10 is added to the positional deviation by the computing device 2.

The characteristic feature of the present embodiment of the invention is that learning control means 10 is appended to the servo controller, and a correctional quantity from this learning control means 10 is added to the positional deviation.

The learning control means 10 comprises: a switch 11 which is turned on by a reference signal from the master control unit, or the like; time/position converting means 12 for converting a positional deviation $\epsilon$ for each prescribed sampling cycle (each position or velocity loop processing cycle) to a positional deviation at a prescribed position $\theta(n)$ with respect to a reference position $\Theta$; an adder 13 for adding correction data for a prescribed position $\theta(n)$ for the previous corresponding pattern cycle stored in memory means 15, to the positional deviation for prescribed position $\theta(n)$ as determined by the time/position converting means (first converting means) 12; filtering means 14 (for example, an FIR type low-pass filter) for determining correction data by filtering the output of the adder 13; memory means 15 for storing correction data for each respective prescribed position; position/time converting means (second converting means) 16 for converting correction data, which is position-based data, read out from a memory section of the memory means 15 corresponding to a respective prescribed position $\theta(n)$, to correction data corresponding to a time base; and a dynamic properties compensating element 17 for compensating for phase delay, fall in gain, and the like, relating to the control object, in this time-based correction data, and then outputting the compensated data to the computing device 2.

The reference position $\Theta$ is a standard position synchronized with the drive object which is driven and controlled by the servo motor 7. This reference position $\Theta$ may be a positional command Pc instructed to the servo motor 7, or a feedback position Pf from the position detector 8, or a positional command or corresponding feedback position supplied to a servo motor driving another drive object which is driven in synchronization with the drive object driven by the servo motor 7, and it may be a position in one pattern cycle forming a reference cycle which is output by the master control unit, such as a numerical control device, or the like, or it may be constituted by a positional signal synchronized to the operation of the drive object driven by the servo motor 7 in one pattern cycle.

The memory means 15 has at least a memory section which stores the correction data for a prescribed position $\theta(n)$ with respect to a reference position $\Theta(n)$ for each prescribed movement distance by dividing one pattern cycle of the operation, such as a repeatedly instructed processing shape, or the like. Taking one pattern cycle as $2\pi$, and the division width as d, then at least ($2\pi/d$) memory sections are provided. For example, assuming that ($2\pi/d$)=q, then memory sections are provided for storing correction data for respective positions $\theta(n)$ from position $\theta(0)=0=2\pi$ to position $\theta(q-1)=2\pi-d$, in the reference position $\Theta$ in the pattern. Below, each position where correction data is stored in the memory means 15, for $\theta(0)=0=2\pi$ to position $\theta(q-1)$, is called a grid position.

The memory means 15 comprises a first memory for storing correction data for one pattern operation when the servo motor 7 rotates in a forward direction, and a second memory for storing correction data for one pattern operation when the servo motor 7 rotates in a reverse direction. Therefore, forward/reverse rotation judging means 20 detects the rotational direction of the servo motor 7 from the velocity command input to the velocity controller 4, or from the polarity of a velocity feedback signal (not illustrated), in such a manner that the memory corresponding to the direction of rotation (forward rotation or reverse rotation) can be selected automatically.

When the switch 11 is turned on by a reference signal, the time/position converting means 12 takes input reference position $\Theta$ as the origin position (original grid position) of the pattern cycle in the repeated control, and sets this position as $\theta(0)$. Thereafter, the position $\theta(n)$ in the pattern cycle is determined according to the position input as the reference position $\Theta$. Moreover, the positional deviation $\epsilon$ is determined for each prescribed sampling cycle (position/velocity loop processing cycle), in other words, it is determined in the form of a time function, and is not determined with respect to the position of the drive object or the rotational position of the servo motor. Therefore, on the basis of the reference position $\Theta$, the time/position converting means 12 converts the positional deviation $\epsilon$ determined in the sampling cycle to a positional deviation at a predetermined grid position $\theta(n)$ with respect to the reference position $\Theta$. The positional deviation at the aforementioned grid position $\theta(n)$ is added to the correction data $\delta(n)$ for the grid position $\theta(n)$ stored in memory means 15, by an adder 13, and updated correction data $\delta(n)$ is then determined for the grid position $\theta(n)$ by filtering the addition result through filtering means 14, whereupon the correction data for the grid position $\theta(n)$ is updated and stored.

Moreover, for each sampling cycle (each position/velocity loop processing cycle), the position/time converting means 16 determines, on the basis of the reference position $\Theta$ determined in the sampling cycle, the correction data $\delta(n)$ for the reference position $\Theta$ at the current sampling time, by means of the correction data $\delta(m)$ and $\delta(m+1)$ for the grid positions $\theta(m)$, $\theta(m+1)$ before and after the reference position $\Theta$. This correction data indicates the correction data at the current sampling time, and hence it is time-based correction data. The correction data determined in this way is then compensated for phase delay and fall in gain, by means of a dynamic properties compensating element 17, similarly to the prior art, thereby deriving a correctional quantity which is output to the computing device 2, where the correctional quantity is added to the positional deviation $\epsilon$, and the resulting sum is multiplied by a positional gain 3 to derive a velocity command.

The reference position $\Theta$ is output in synchronization with the drive of the drive object and servo motor 7, and consequently, the reference position $\Theta$ completely corresponds to the positions of the drive object and servo motor 7, and the fact that the reference position for the previous pattern cycle corresponds to the positions of the drive object and servo motor 7 and that the correction data constituted by the positional deviation, and the like, at that time is added to the positional deviation obtained at the current sampling time, means that correction data constituted by the positional deviation, and the like, of the previous pattern cycle is added.

Figure 2:
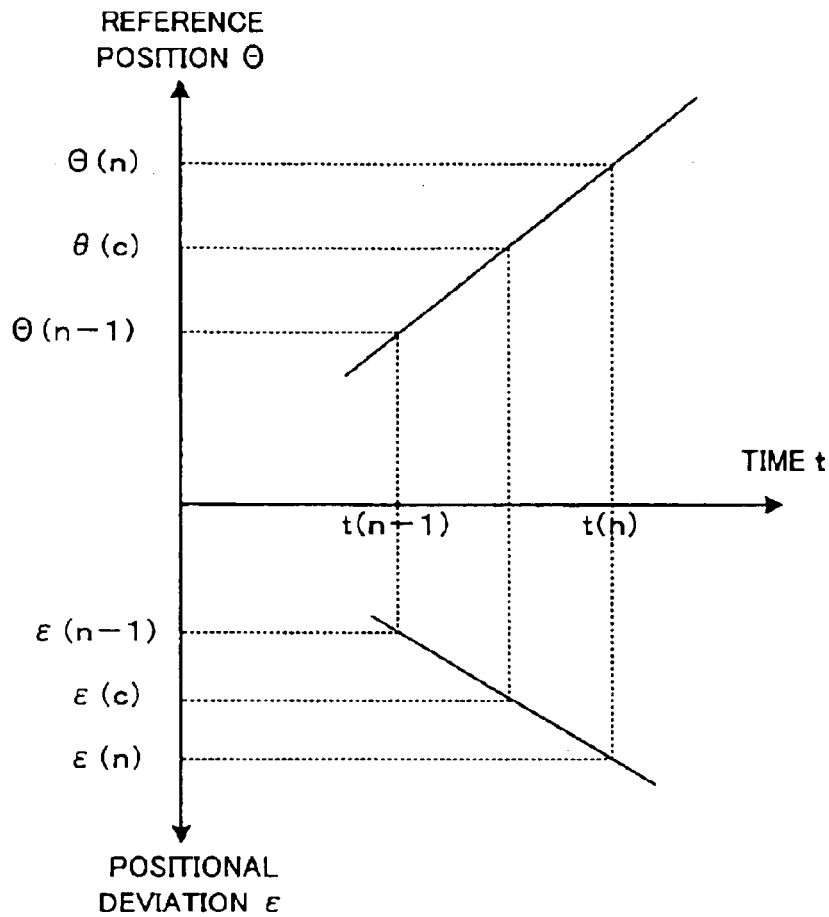
FIG. 2 is an illustrative diagram of processing performed by time/position converting means according to a first embodiment, for converting a positional deviation obtained by sampling, to a positional deviation relating to a position.

FIG. 2 is an illustrative diagram of the processing implemented by the time/position converting means 12 for converting the positional deviation $\epsilon$ obtained during sampling to a positional deviation corresponding to a respective grid position $\theta(n)$ with respect to the reference position $\Theta$. The horizontal axis represents time (sampling time), and the upward direction of the vertical axis represents the reference position Θ. Moreover, the downward direction of the vertical axis represents the positional deviation ε.

It is supposed that the positional deviation determined at the previous sampling cycle t(n−1) is ε(n−1), and the reference position Θ is Θ(n−1). The positional deviation determined at the current sampling time t(n) is taken to be ε(n) and the reference position Θ is taken to be Θ(n). The grid position between the reference positions of the previous sampling cycle and the current sampling cycle, Θ(n−1) and Θ(n), is determined. For example, it is supposed that the grid position θ(c) is located between these positions Θ(n−1) and Θ(n), as illustrated in FIG. 2.

Moreover, if the positional deviations detected at sampling times t(n−1) and t(n) are taken to be ε(n−1) and ε(n), then the positional deviation approximates a linear change between the reference positions Θ(n−1) and Θ(n), and hence the positional deviation θ(c) corresponding to grid position θ(c) between the reference positions Θ(n−1) and Θ(n) can be determined by interpolation, as expressed by equation 1 below.

$$\epsilon(c)=\epsilon(n-1)+\{(\theta(c)-\Theta(n-1))\cdot\{\epsilon(n)-\epsilon(n-1)\}/\{\Theta(n)-\Theta(n-1)\} \quad (1)$$

The positional deviation ε(c) for grid position θ(c) determined in this manner is added to the correction data δ(c) stored in correspondence with the grid position θ(c) in the memory means 15, by the adder 13, whereupon the sum is passed through filtering means 14 to derive new correction data δ(c) corresponding to the grid position θ(c), which is then stored in the memory section of the memory means 15 corresponding to grid position θ(c), thereby updating the memory. If there exists no grid position between the reference positions Θ(n−1) and Θ(n) (=θ(n)), then no updating of the correction data in the memory means is carried out. On the other hand, if there are a plurality of grid positions between the reference positions Θ(n−1) and Θ(n), then the correction data for this plurality of grid positions are updated respectively.

Figure 3:
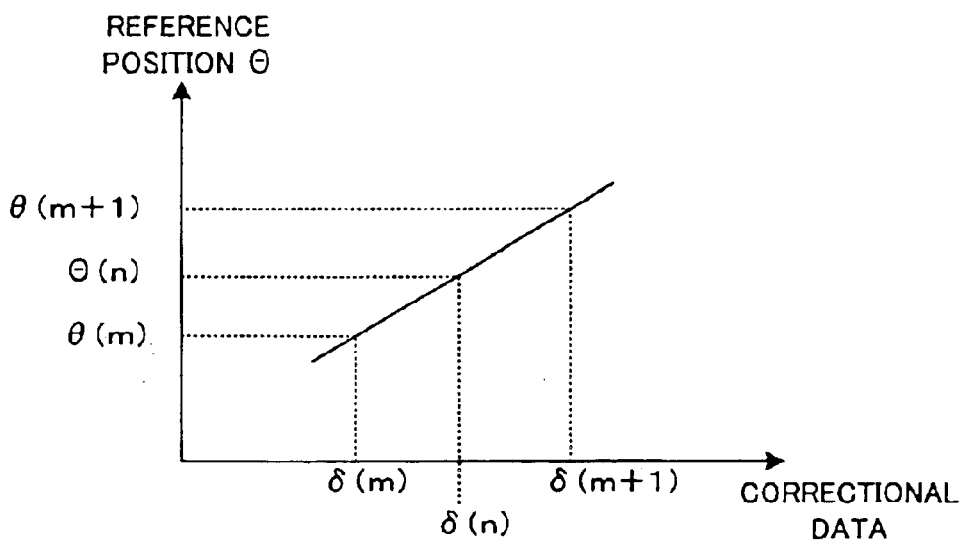
FIG. 3 is an illustrative diagram of processing implemented by position/time converting means according to a first embodiment, for converting correction data for a position into correction data for a sampling time.

FIG. 3 is an illustrative diagram of the processing implemented by the position/time converting means 16 for determining, from the reference position Θ obtained at s sampling time, correction data δ(n) at that sampling time.

Assuming that the reference position obtained at a certain sampling time is Θ(n), then the correction data stored in the memory means 15 in correspondence with the grid positions θ(m) and θ(m+1) before and after that reference position Θ(n) will be δ(m) and δ(m+1). If change in the correction data from grid position θ(m) to θ(m+1) is approximated to linear change, then the correction data δ(n) for the reference position Θ(n) in the pattern cycle at the current sampling time can be obtained by interpolation based on equation 2 below.

$$\delta(n)=\delta(m)+\{\Theta(n)-\theta(m)\}\cdot\{\delta(m+1)-\delta(m)\}/\{\theta(m+1)-\theta(m)\} \quad (2)$$

Since the correction data δ(n) thus obtained corresponds to the reference position Θ(n) at the current sampling time, and also corresponds to the command position Pc delivered to the servo motor 7, it can be used as correction data in the current sampling operation. Consequently, as described above, a correctional quantity is determined by processing for compensating for dynamic properties, and the correction data δ(n) is then added to the positional deviation δ(n) for the current sampling cycle.

At each sampling time, the processing of the position/time converting means 16 is carried out first, whereupon the processing of the time/position converting means 12 is carried out, and the correction data stored in the memory means 15 is updated accordingly.

Figure 4:
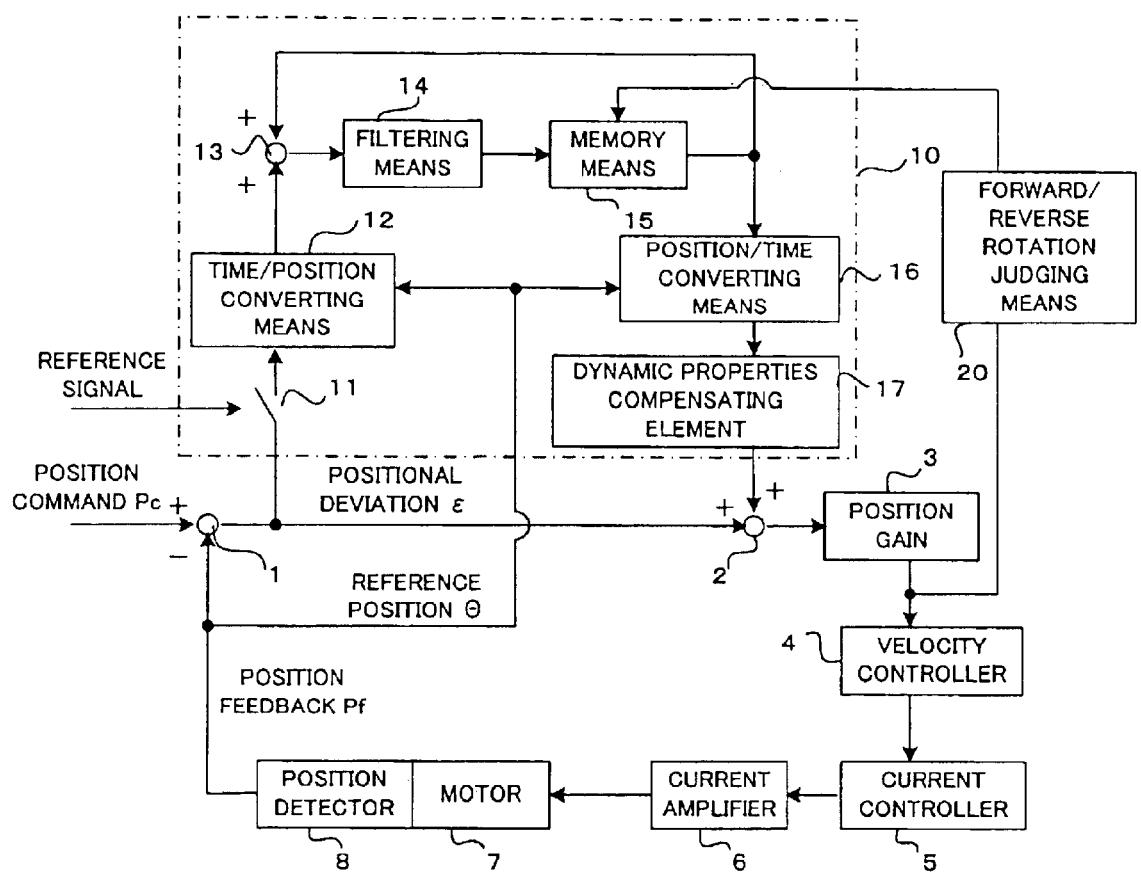
FIG. 4 is a principal block diagram of a first modification of the first embodiment of the present invention.

FIG. 4 is a principal block diagram of an embodiment where the reference position Θ is taken to be the feedback position Pf from a position detector 8 installed on the servo motor 7. The feedback position Pf of a servo motor 7 having learning control means 10 installed in the servo control system thereof is taken as the reference position Θ, and the servo motor 7 is controlled by adding, to the positional deviation of the current sampling cycle, a correctional quantity based on correction data constituted by the positional deviation, and the like, of the previous pattern cycle. The composition of the learning control means 10 is the same as that illustrated in FIG. 1.

Figure 5:
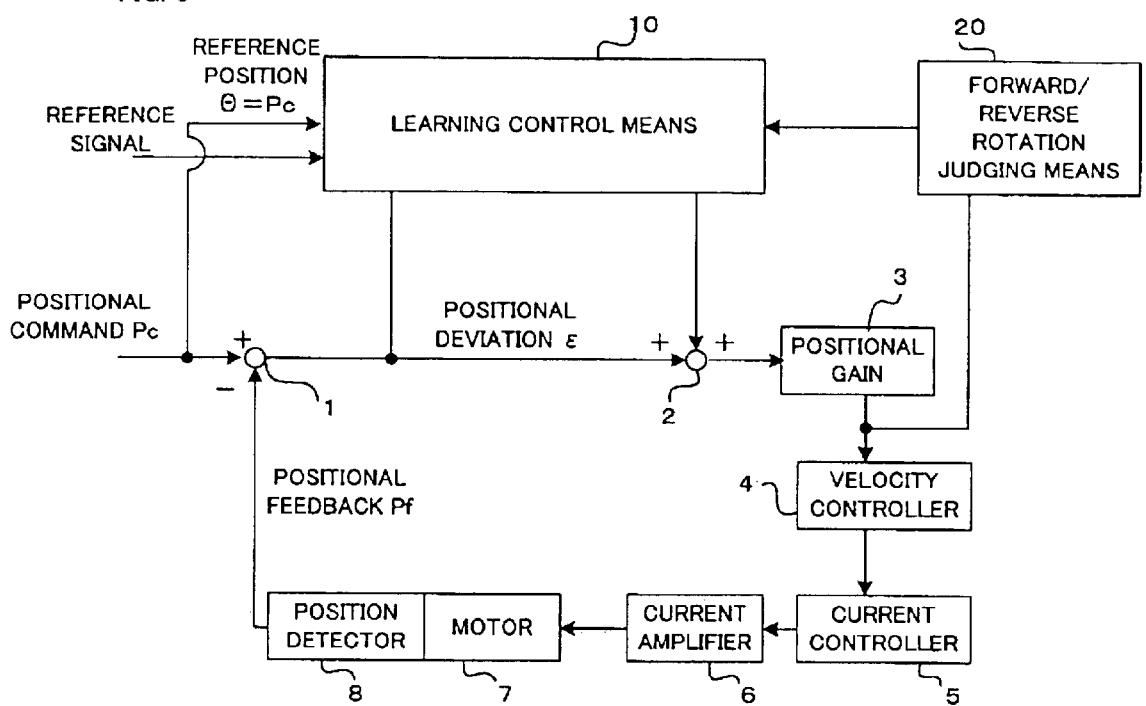
FIG. 5 is a principal block diagram of a second modification of the first embodiment of the present invention.

Moreover, FIG. 5 illustrates a case where the positional command Pc supplied to the servo motor 7 is taken as the reference position Θ. The remaining composition is the same as that in FIG. 1.

Figure 6:
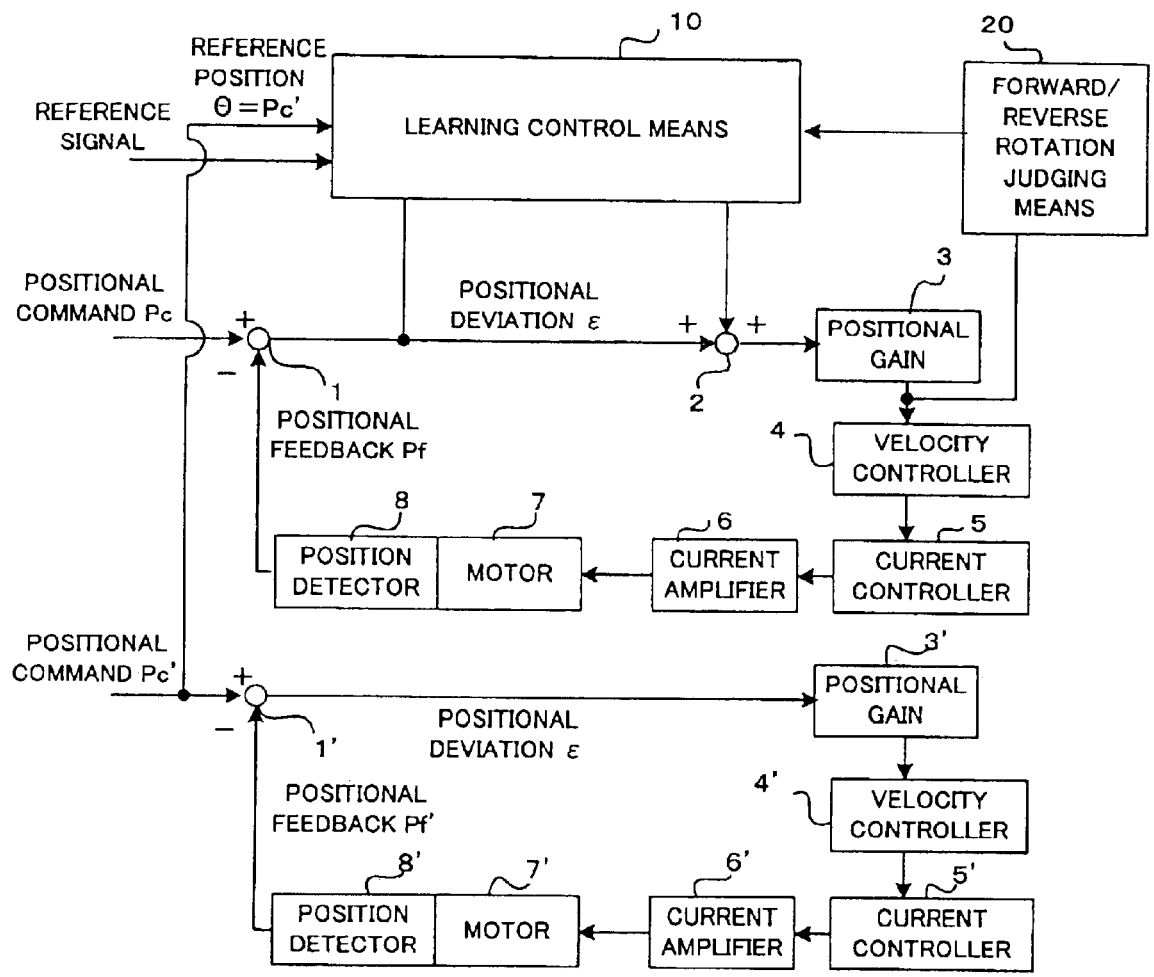
FIG. 6 is a principal block diagram of a third modification of the first embodiment of the present invention.

FIG. 6 illustrates a case where the position of another drive object which is driven in synchronization with the drive object driven by the servo motor 7 is taken as the reference position Θ. In the example shown in FIG. 6, the positional command Pc' supplied to the servo motor 7' driving the other drive object is taken as a reference position Θ and input to the learning control means 10. The control system for the servo motor 7' driving this other drive object is the same as the control system of the servo motor 7, and hence description thereof is omitted here.

Figure 7:
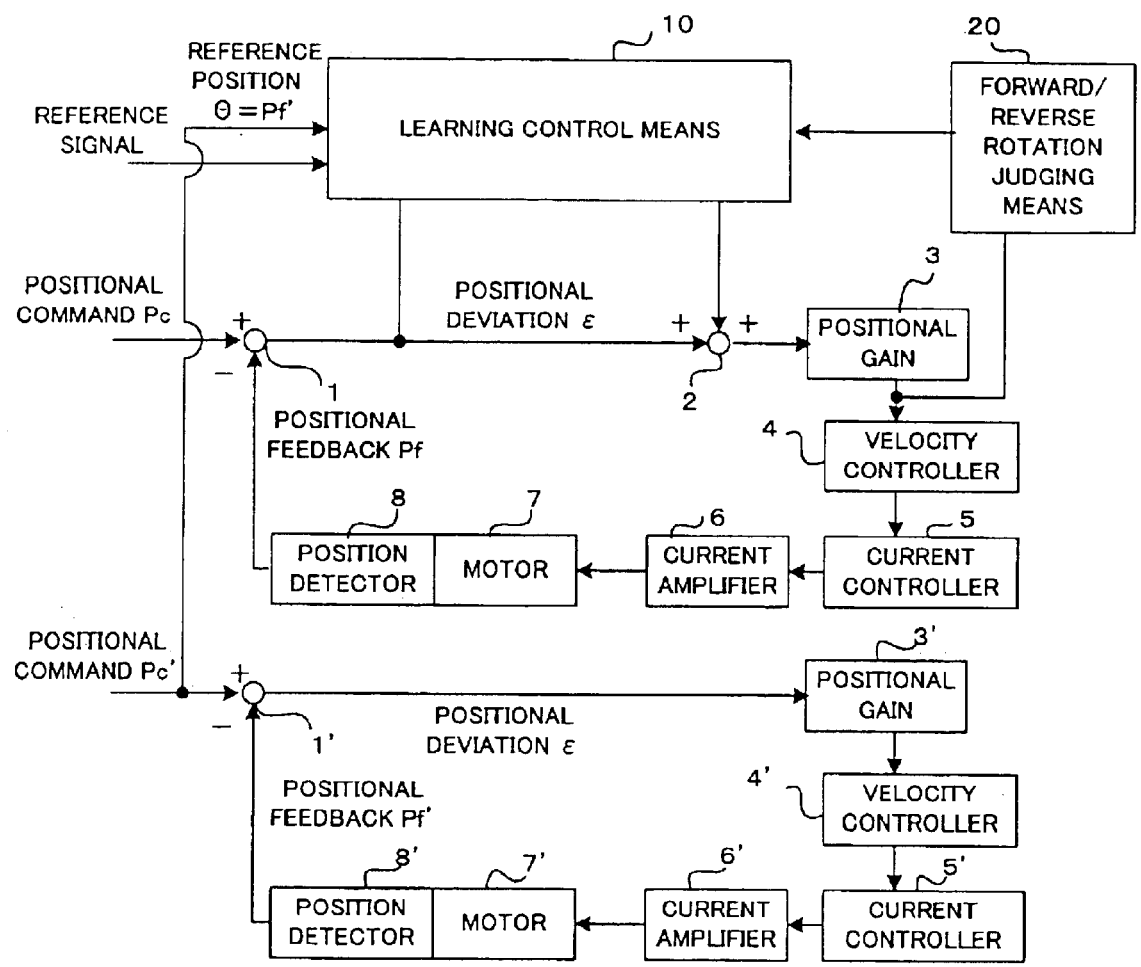
FIG. 7 is a principal block diagram of a fourth modification of the first embodiment of the present invention.

FIG. 7 shows a case where the feedback position of another drive object driven in synchronization with the drive object driven by the servo motor 7 (namely, the feedback position from a positional detector 8' installed on the servo motor 7') Pf' is taken as the reference position Θ.

Figure 8:
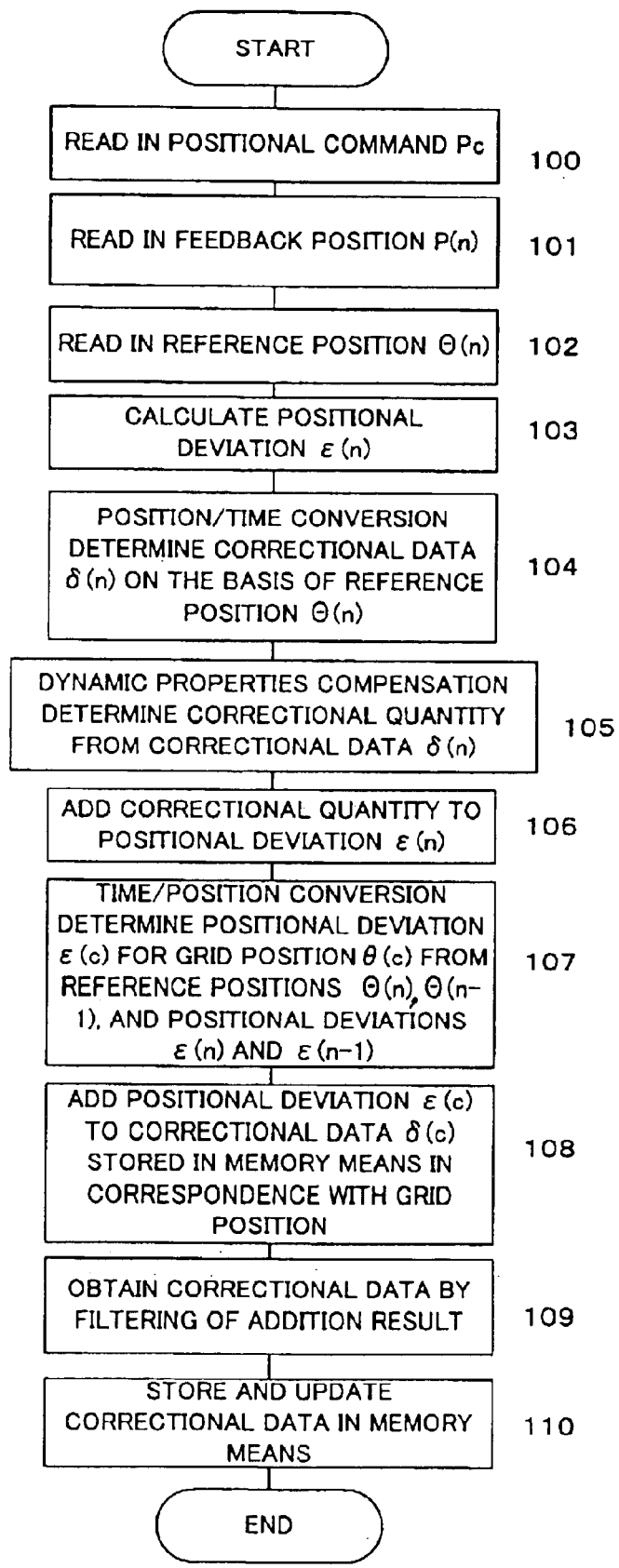
FIG. 8 is a flowchart of learning control processing implemented in each sampling cycle in the first embodiment.

FIG. 8 is a flowchart of learning control processing implemented by a processor of the servo controller performing position/velocity loop processing, and the like, or by a processor provided independently in the learning control means, at each prescribed sampling cycle (each position/velocity loop processing cycle).

Firstly, the processor reads in a positional command Pc(n) output by the master control unit, such as a numerical control device, or the like, and also reads in the actual position Pf(n) and reference position Θ(n) fed back from the position detector 8 (steps 100–102). If the reference position Θ(n) is the feedback position Pf(n) or the positional command Pc(n) as illustrated in FIG. 4 or FIG. 5, then the reference position Θ(n) will be Θ(n)=Pf(n) or Θ(n)=Pc(n), and consequently the processing in step 102 is omitted. Moreover, if the positional command to another drive object Pc' or the feedback position thereof. Pf' is taken as the reference position Θ, as illustrated in FIG. 6 or FIG. 7, then these positions are read in.

Thereupon, the positional deviation ε(n) is determined by subtracting the actual position Pf(n) supplied as feedback, from the command position Pc(n) (step 103). As described above, the grid positions θ(m) and θ(m+1) before and after the reference position Θ(n) thus read in are obtained, correction data δ(m) and δ(m+1) to be stored in the memory means 15 in correspondence with these grid positions θ(m) and θ(m+1) are obtained, and the correction data δ(n) for the current sampling cycle is then derived by means of the calculation in equation (2) above (step 104).

A correctional quantity is determined by subjecting this correction data δ(n) to processing for compensating for dynamic properties (step 105). The correctional quantity thus derived is added to the positional deviation ε(n) determined at step 103 (step 106). The sum of the positional deviation and the correctional quantity is then multiplied by a positional gain to determine a velocity command, and further, velocity loop processing is carried out, but since the following processing is the same as the prior art, it is omitted from the illustration in FIG. 8.

Meanwhile, the grid position θ(c) between the reference position Θ(n) derived at step 101 and the reference position Θ(n−1) derived in the previous sampling period is determined, and the positional deviation ϵ(c) for that grid position θ(c) is determined by means of the calculation processing in equation (1) above, from reference positions Θ(n−1) and Θ(n), and the positional deviations ϵ(n) and ϵ(n−1) at the respective sampling times (step 107).

The correction data δ(c) for the grid position θ(c) stored in the memory means 15 is added to the positional deviation ϵ(c) determined in step 107 (step 108), and the result is then filtered to determine updated correction data δ(c) (step 109), and the correction data for the grid position θ(c) is rewrote to this updated correction data δ(c)(step 110), whereupon the processing for the current sampling cycle is completed.

Thereafter, learning control based on position is implemented, whereby the processing illustrated in FIG. 8 as described above is carried out for each sampling cycle (position/velocity loop processing cycle), and the positional deviation is corrected by obtaining a correctional quantity corresponding to a position in one pattern cycle, in other words, a position in the work processing shape, or the like. Therefore, even if the velocity changes, the relationship between the correction data and position does not change, and consequently it is still possible to make the positional deviation converge accurately to zero.

Figure 9:
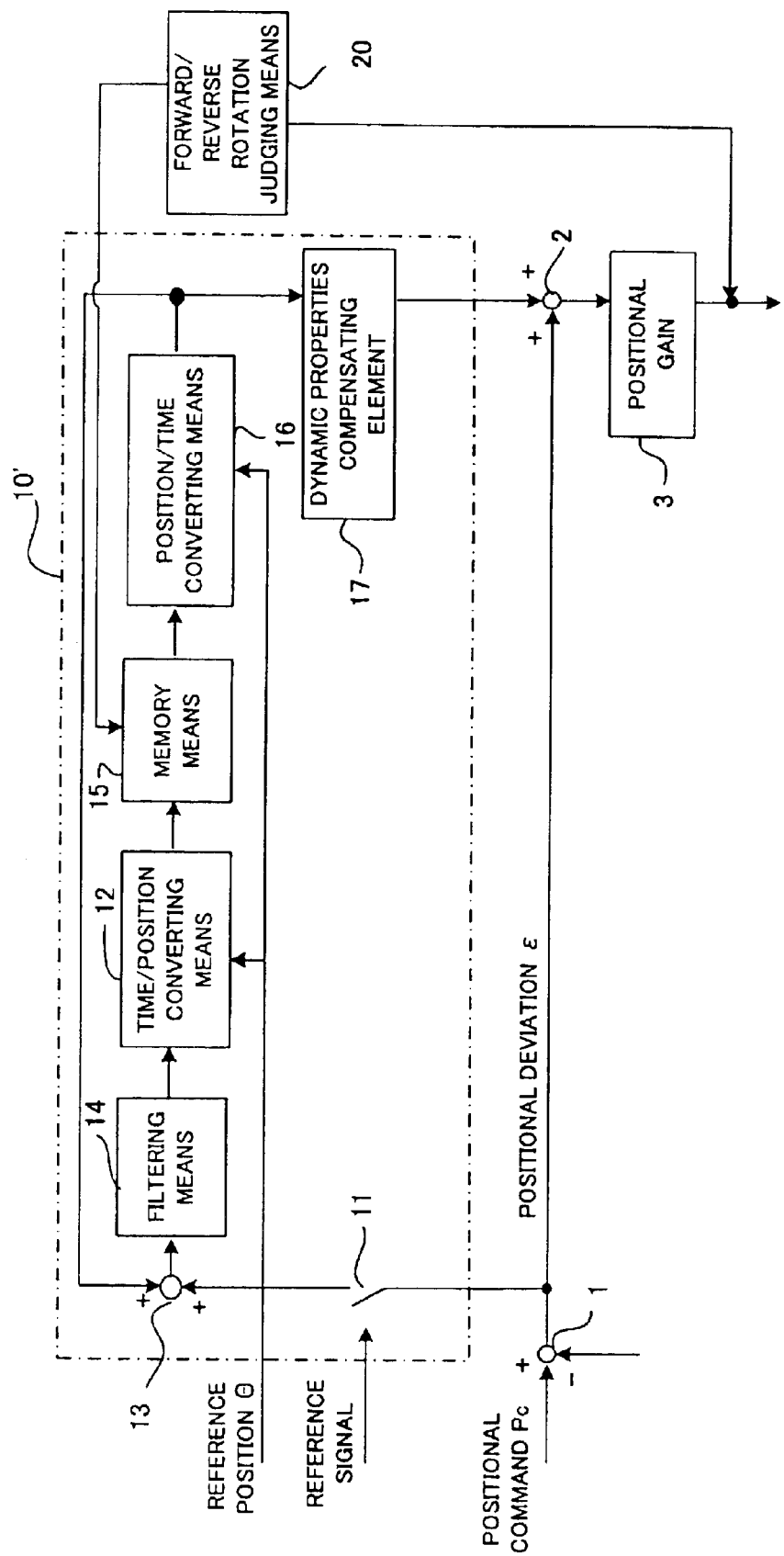
FIG. 9 is a principal block diagram of a second embodiment of the present invention.

FIG. 9 is a principal block diagram of a second embodiment of the present invention. This second embodiment differs from the composition of the learning control means 10 (FIG. 1) according to the first embodiment described previously in that time/position converting means (first converting means) 12 is provided after filtering means 14 in the learning control means 10'. Elements corresponding to those of the first embodiment are labelled with the same reference symbols.

In this second embodiment, the positional deviation ϵ(n) determined by sampling is added to the correction data for the previous pattern cycle corresponding to the sampling time by the adder 13, and then the result is filtered by the filtering means 14 so that correction data for the current sampling time is obtained. Time/position conversion processing is then applied to this correction data, by the time/position converting means 12 (first converting means), thereby deriving correction data for the grid position θ(c).

Taking the correction data determined by sampling in the previous cycle as δ(n−1), the correction data determined at the current sampling time as δ(n), and the correction data for the grid position θ(c) as δ(c), the calculation in equation (3) below is carried out. Replacing the terms ϵ(c), ϵ(n−1) and ϵ(n) in equation (1) with δ(c), δ(n−1) and δ(n), respectively, equation (3) corresponds to equation (1).

$$\delta(c)=\delta(n-1)+\{(\theta(c)-\Theta(n-1))\cdot\{\delta(n)-\delta(n-1)\}/\{\Theta(n)-\Theta(n-1)\} \quad (3)$$

The correction data δ(c) for the grid position θ(c) thus obtained is stored in the memory means 15, thereby updating the correction data.

Furthermore, the processing carried out by the position/time converting means (second converting means) 16 is the same as that in the first embodiment, the only difference being that the position/time converting means 16 outputs to the adder 13. The remaining composition is the same as that in first embodiment and description thereof is omitted here.

In the first and second embodiments described above, the position of the servo motor 7, 7' is detected and fed back by a position detector 8, 8', but the present invention may also be applied to devices where the movement position of the drive object driven by the servo motor 7, 7' is detected directly by a position detector and fed back (in a block closed loop).

Figure 10A:
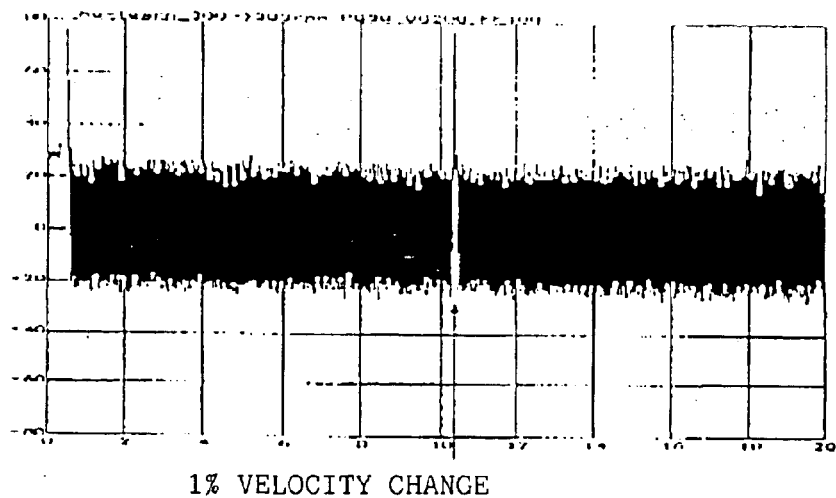
FIG. 10A–FIG. 10C show experimental results for comparing positional deviation respectively in a case where no learning control is implemented (FIG. 10A), a case where conventional learning control is implemented (FIG. 10B), and a case where learning control according to the present invention (as in the mode in FIG. 5) is implemented (FIG. 10C)
Figure 10B:
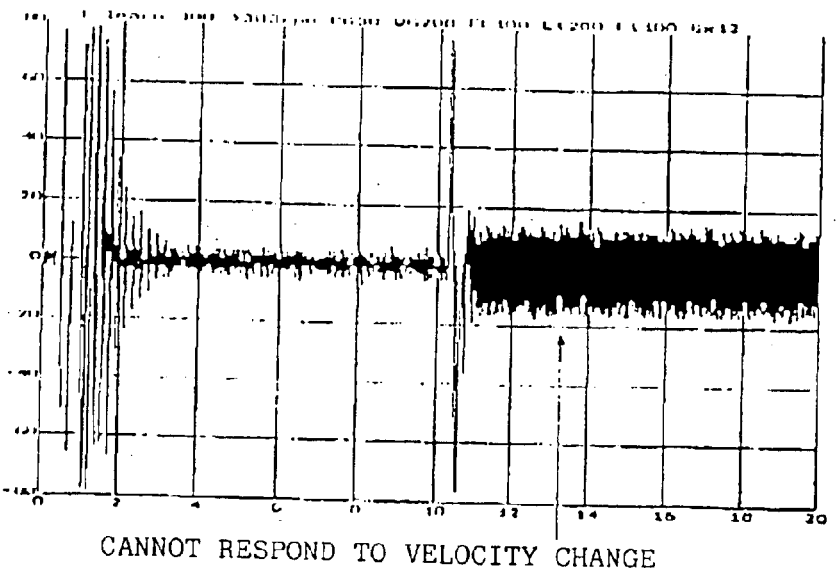
Figure 10C:
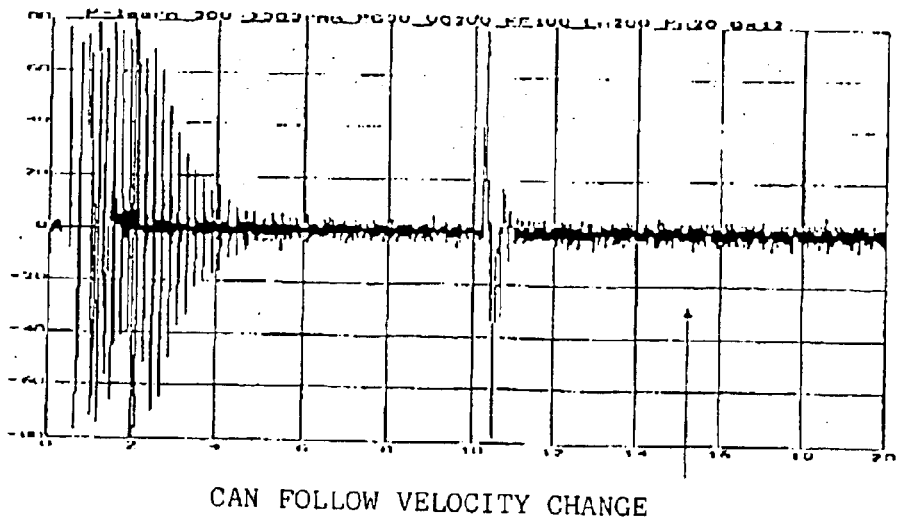

FIG. 10A to FIG. 10C and FIG. 11A to FIG. 11C show the results of experimentation carried out in order to corroborate the beneficial effects of the present invention. In the experimental examples shown in FIG. 10A–FIG. 10C, four external disturbance components were applied to one rotation in a case where the rotational command was 300 rpm and the velocity change was 1%, and a comparison was made between a case where position-based learning control according to the present invention using the positional command Pc of its own as the reference position Θ (as in the mode illustrated in FIG. 5) was implemented (FIG. 10C), a case where conventional learning control for storing correction data at each sampling time was implemented (FIG. 10B), and a case where no learning control was implemented (FIG. 10A). In FIG. 10A–FIG. 10C, the horizontal axis represents time and the vertical axis represents positional deviation.

As shown in FIG. 10A, when no learning control is implemented, then even if there is a 1% change in velocity, the positional deviation does not change and hence a large positional deviation results.

Moreover, if conventional learning control is applied as illustrated in FIG. 10B, then when a velocity change occurs, the positional deviation increases, and thus it can be seen that this learning control is not able to handle velocity change.

On the other hand, in FIG. 10C where the position-based learning control according to the present invention is applied, it can be seen that even if there is a change in velocity, the positional deviation is maintained at a small value which converges to zero, and hence the system is able to follow velocity change as well.

Furthermore, FIG. 11A–FIG. 11C relate to experiments wherein a linearly moving axis operating in the radial direction is moved back and forth reciprocally in a sinusoidal fashion, in synchronization with the angle of a rotating axis, and commands are issued in such a manner that the amplitude of the linearly moving axis and the speed of rotation of the rotating axis both change gradually over time, a comparison being made between a case where no learning control is implemented (FIG. 11A), a case where conventional time-based learning control is applied (FIG. 11B), and a case where angle-based learning control according to the present invention is applied (FIG. 1C). Here, the application of the present invention corresponds to the mode illustrated in FIG. 6, wherein a linearly moving axis is driven by a servo motor 7, learning control means 10 is incorporated into the servo control system of the servo motor 7, and the positional command Pc' supplied to the servo motor 7' driving the rotating axis is taken as the reference position Θ to be input to the learning control means 10. In FIG. 11A–FIG. 11C, the horizontal axis represents time and the vertical axis represents the positional deviation of the linearly moving axis.

FIG. 11A shows the experimental results for a case where no learning control was implemented, and here, a large positional deviation occurs. Moreover, FIG. 11B shows the experimental results for a case where conventional learning control using a time base is implemented, and in this case, although the positional deviation can sometimes be reduced, in general, a large positional deviation results.

On the other hand, in FIG. 11C which shows the results of a case where position-based (angle-based) learning control according to the present invention is applied, the positional deviation becomes extremely small. It must be noted that whereas FIG. 11A and FIG. 11B depict a distance of 20 μm per division, FIG. 11C depicts a distance of only 1 μm, or ½₀ th the distance, per division.

As described above, according to the present invention, learning control is adopted wherein correction data is stored in correspondence with a position in the shape of a repeatedly instructed pattern, and the positional deviation is corrected in accordance with the position, and therefore the positional deviation can be reduced to a small value so as to converge towards zero, even if there is a change in velocity.

What is claimed is:

1. A servo motor drive control device for driving and controlling a periodically operated drive object by means of a servo motor, comprising:

a position detector for detecting the position of said drive object;

means for obtaining the positional deviation between a positional command supplied to the servo motor and the position of said drive object as fed back by said position detector, for each sampling cycle;

first converting means for converting said positional deviation into a positional deviation at a prescribed position with respect to a reference position output in synchronization with the drive of said drive object;

correction data calculating means for obtaining, from the positional deviation at said prescribed position determined by the first converting means, correction data corresponding to the prescribed position;

storing means for storing the correction data obtained by said correction data calculating means, for at least one cycle; and second converting means for converting the correction data for said prescribed position stored in said storing means, to correction data for each of said sampling cycles;

wherein the position of said drive object is controlled on the basis of said positional deviation and the correction data obtained by the second converting means.

2. The servo motor drive control device according to claim 1, wherein said correction data calculating means comprises: adding means for adding correction data for said prescribed position of the previous cycle as stored in said storing means, to the positional deviation at said prescribed position; and filtering means for filtering the positional deviation output by the adding means, determining new correction data, and outputting same to said storing means.

3. A servo motor drive control device for controlling a periodically operated drive object, by means of a servo motor, by performing at least positional loop control, comprising:

storing means for storing correction data for a prescribed position at a reference position output in synchronization with the drive of said drive object, for one cycle;

second converting means for determining correction data for each sampling time period from the correction data corresponding to a prescribed position stored in said storing means;

means for correcting said positional deviation by determining a correctional quantity from the correction data determined by said second converting means;

adding means for adding the correction data determined by said second converting means to the positional deviation detected at each sampling period;

filtering means for determining updated correction data for each sampling period by filtering the addition result from the adding means; and first converting means for determining correction data for each of said prescribed positions, from the correction data for each sampling period output by said filtering means, and outputting same to said storing means.

4. The servo motor drive control device according to claim 1 or claim 2, wherein said first converting means obtains a positional deviation at said prescribed position on the basis of the positional deviation detected at each sampling period, and said reference position.

5. The servo motor drive control device according to claim 3, wherein said first converting means obtains correction data for said prescribed positions, respectively, from the correction data determined for each sampling period.

6. The servo motor drive control device according to claim 1 or 3, wherein said reference position is either the command position supplied to said drive object or another drive object, or the detected position of said drive object or said other drive object.

7. The servo motor drive control device according to claim 1 or 3, wherein said second converting means determines correction data for the sampling period on the basis of the reference position for the sampling period and the correction data corresponding to said prescribed position stored in said storing means.

8. The servo motor drive control device according to claim 1 or 3, further comprising:

a polarity judging section for judging the polarity of a velocity command or velocity feedback signal;

wherein said storing means has two storing sections for respectively storing correction data according to the polarity of the velocity command or velocity feedback signal; and said two storing sections are switched alternatively in accordance with the polarity of the velocity command or velocity feedback signal as judged by said polarity judging section.

9. The servo motor drive control device according to claim 1 or 3, wherein said prescribed positions for the correction data stored in said storing means are determined respectively by taking said reference position when a reference signal is input from an external source, as a zero position.

* * * * *

UNITED STATES PATENT AND TRADEMARK OFFICE
CERTIFICATE OF CORRECTION

PATENT NO. : 6,859,007 B2
DATED : February 22, 2005
INVENTOR(S) : Yukio Toyozawa et al.

It is certified that error appears in the above-identified patent and that said Letters Patent is hereby corrected as shown below:

Title page,
Item [73], Assignee, change "Fanuc Ltd" to -- FANUC LTD --.

Column 7,
Line 18, please change "$\theta(c)$" to -- $\varepsilon(c)$ --.

Column 8,
Line 50, after the word "thereto", please delete -- . --.

Column 10,
Line 51, please change "(FIG. 1C)" to -- (FIG. 11C) --.

Signed and Sealed this

Thirteenth Day of September, 2005

JON W. DUDAS
*Director of the United States Patent and Trademark Office*